(12) United States Patent
Kuwano et al.

(10) Patent No.: US 9,310,240 B2
(45) Date of Patent: Apr. 12, 2016

(54) CIRCUIT DEVICE, INTEGRATED CIRCUIT AND DETECTION DEVICE

(75) Inventors: Toshikazu Kuwano, Fujimi-machi (JP); Satoshi Kubota, Hokuto (JP)

(73) Assignee: SEIKO EPSON CORPORATION, Tokyo (JP)

(*) Notice: Subject to any disclaimer, the term of this patent is extended or adjusted under 35 U.S.C. 154(b) by 1033 days.

(21) Appl. No.: 13/421,174

(22) Filed: Mar. 15, 2012

(65) Prior Publication Data

US 2012/0242170 A1   Sep. 27, 2012

(30) Foreign Application Priority Data

Mar. 22, 2011 (JP) ................................. 2011-062665
Feb. 13, 2012 (JP) ................................. 2012-028091

(51) Int. Cl.
*H01H 51/34* (2006.01)
*G01F 15/075* (2006.01)

(52) U.S. Cl.
CPC ........... *G01F 15/075* (2013.01); *Y10T 307/872* (2015.04)

(58) Field of Classification Search
CPC .......................... G01F 15/075; Y10T 307/872
USPC ....................................................... 307/132 R
See application file for complete search history.

(56) References Cited

U.S. PATENT DOCUMENTS

| 6,278,638 | B1* | 8/2001 | Tomita et al. ............ 365/189.07 |
| 6,523,271 | B2 | 2/2003 | Kato |
| 2003/0081461 | A1 | 5/2003 | Yamauchi et al. |
| 2003/0128076 | A1 | 7/2003 | Ogawa et al. |
| 2003/0205996 | A1* | 11/2003 | Hara et al. ................ 324/117 R |
| 2004/0130317 | A1* | 7/2004 | Hatanaka ................... 324/207.2 |
| 2005/0030113 | A1 | 2/2005 | Ogawa et al. |
| 2005/0253661 | A1 | 11/2005 | Lee |
| 2006/0152291 | A1 | 7/2006 | Ogawa et al. |
| 2007/0222531 | A1 | 9/2007 | Ogawa et al. |
| 2008/0048772 | A1 | 2/2008 | Nishikawa |
| 2008/0265880 | A1* | 10/2008 | Nishikawa .................... 324/251 |
| 2010/0007395 | A1 | 1/2010 | Sugie |
| 2010/0011856 | A1* | 1/2010 | Nagata ........................ 73/504.12 |
| 2012/0062222 | A1* | 3/2012 | Watanabe et al. ............ 324/251 |

FOREIGN PATENT DOCUMENTS

| JP | 63-242018 A | 10/1988 |
| JP | A-5-296811 | 11/1993 |
| JP | A-6-258117 | 9/1994 |
| JP | A-7-71995 | 3/1995 |
| JP | H09-107273 A | 4/1997 |
| JP | 09-116392 A | 5/1997 |
| JP | H11-311559 A | 11/1999 |
| JP | A-2000-74709 | 3/2000 |
| JP | A-2002-39757 | 2/2002 |
| JP | A-2002-296083 | 10/2002 |
| JP | 2003-133935 A | 5/2003 |
| JP | 2003-332891 A | 11/2003 |

(Continued)

*Primary Examiner* — Rexford Barnie
*Assistant Examiner* — Toan Vu
(74) *Attorney, Agent, or Firm* — Oliff PLC

(57) ABSTRACT

A circuit device includes an amplifier circuit to which a signal from a sensor is input and a control circuit which controls the sensor and the amplifier circuit. An intermittent operation of the sensor and an intermittent operation of the amplifier circuit are controlled by an intermittent operation control signal output from the control circuit.

9 Claims, 9 Drawing Sheets

(56) References Cited

FOREIGN PATENT DOCUMENTS

| JP | 2005-328495 A | 11/2005 |
|----|---------------|---------|
| JP | 2007-159288 A | 6/2007  |
| JP | 2008-032424 A | 2/2008  |
| JP | 2008-054220 A | 3/2008  |
| JP | A-2009-198429 | 9/2009  |

* cited by examiner

CIRCUIT DEVICE, INTEGRATED CIRCUIT AND DETECTION DEVICE

The present application claims a priority based on Japanese Patent Application No. 2011-062665 filed on Mar. 22, 2011 and Japanese Patent Application No. 2012-028091 filed on Feb. 13, 2012, the contents of which are incorporated herein by reference.

BACKGROUND

1. Technical Field

The present invention relates to a circuit device, an integrated circuit and a detection device, particularly, to a circuit device, an integrated circuit and a detection device which are used for control of an apparatus which uses a sensor.

2. Related Art

In the related art, a detection device or the like which includes a sensor, a technique has been proposed which supplies electric power to the sensor only at the time of measurement to suppress power consumption. For example, in JP-A-2000-74709, in an electronic water meter which is an example of a detection device, a low power consumption operation is realized by supplying electric power to a sensor only at the time of measurement.

However, in JP-A-2000-74709, the sensor is only intermittently operated, and different circuits are constantly operated. In order to further suppress power consumption, it is desirable that the circuits other than the sensor be intermittently operated. For example, if an amplifier circuit which receives an output signal of the sensor and amplifies the signal and a conversion circuit which converts the output signal of the sensor, in addition to the sensor, are also intermittently operated, it is possible to further suppress power consumption.

In a case where the intermittent operation is performed, as the operation time of the sensor, the amplifier circuit and the conversion circuit becomes short, the power consumption reduction effect becomes high. For example, the operation time can be controlled according to the pulse width of a pulse signal used for control. In this case, as the pulse width becomes small, the control can be performed so as to reduce power consumption.

However, if a pulse signal used for control is generated in a sync design based on a system clock, the frequency of the system clock influences the pulse width of the pulse signal used for control. Further, in consideration of unevenness in manufacturing or the like, it is desirable that the pulse width of the pulse signal used for control can be easily and accurately adjusted in shipping, for example.

Further, when the intermittent operation is performed, a settling time is necessary from the time when the circuits are stopped to the time when the circuits start operation and their outputs are stabilized. At this time, it is desirable that the intermittent operation be performed in consideration of an appropriate settling time according to characteristics of the sensor or the amplifier circuit.

SUMMARY

An advantage of some aspects of the invention is to solve at least a part of the problems described above, and the invention can be implemented in the following embodiments or application examples.

An aspect of the invention is directed to a circuit device including: an amplifier circuit to which a signal from a sensor is input; and a control circuit which controls intermittent operations of the sensor and the amplifier circuit. The control circuit of this circuit device outputs an intermittent operation control signal to control an intermittent operation of the sensor and the amplifier circuit. According to this configuration, since the amplifier circuit which receives the output signal of the sensor and amplifies the signal also operates intermittently, in addition to the sensor, it is possible to suppress power consumption of the circuit device.

In the circuit device as described above, it is preferred that the intermittent operation control signal includes a first intermittent operation control signal which controls power supply to the sensor and a second intermittent operation control signal which controls power supply to the amplifier circuit. A period when the first intermittent operation control signal enters an active state is preferably different from a period when the second intermittent operation control signal enters an active state.

For example, the first intermittent operation control signal may become in the active state in a predetermined period after the second intermittent operation control signal enters the active state. In this case, the period when the first intermittent operation control signal enters the active state may be shorter than the period when the second intermittent operation control signal enters the active state. In comparison of settling times from the time when the circuit starts the operation to the time when the output is stabilized, the settling time of the sensor which includes a resistor element is shorter than the settling time of the amplifier circuit. Thus, by starting the intermittent operation of the sensor after a predetermined time elapses from the start of the intermittent operation of the amplifier circuit, it is possible to reduce power consumption of the sensor without influence on the output stabilizing operation of the amplifier circuit.

In the circuit device as described above, it is preferred that the circuit device further includes a switch which is able to switch power supply on/off with respect to the sensor and the amplifier circuit. According to this configuration, as the intermittent operation control signal changes the on/off state of the switch to control the power supply, it is possible to reduce power consumption of the circuit.

In the circuit device as described above, it is preferred that the control circuit includes a pulse generating circuit which includes a constant current source which generates electric current of a predetermined current value, a capacitor which is charged with electric charge by the electric current from the constant current source, and a comparator which outputs a pulse signal on the basis of a result obtained by comparing a voltage based on the electric charge charged in the capacitor with a reference voltage having a predetermined voltage value.

In the circuit device as described above, it is preferred that the pulse generating circuit includes the constant current source, the capacitor which is charged with electric charge by the electric current from the constant current source, and the comparator which compares the voltage based on the electric charge charged in the capacitor with the reference voltage. According to this configuration, by changing at least one of the current value of the constant current source, the capacitance of the capacitor and the voltage value of the reference voltage, it is possible to easily and accurately adjust a timing of a pulse signal.

The output of the comparator obtained by comparing the voltage based on the electric charge charged in the capacitor with the reference voltage serves as the pulse signal. Thus, for example, by changing the reference voltage, it is possible to generate a different pulse signal, and to generate a pulse signal which is asynchronous to a system clock.

In this regard, the capacitor may be grounded at one terminal which is a first terminal, and may be serially connected to the constant current source at the other terminal which is a second terminal. Further, the voltage based on the electric charge charged in the capacitor may be a voltage of the second terminal. For example, the current value of the constant current source, the capacitance of the capacitor and the voltage value of the reference voltage may be changed in an interlocking or individual manner according to a signal from the outside of the pulse generating circuit.

In the circuit device as described above, it is preferred that the circuit device further includes a pull-up transistor which pulls up an output terminal of the comparator to a power potential on a high potential side.

In the circuit device as described above, it is preferred that the control circuit generates a first enable signal and a second enable signal which enters an active state in a predetermined period after the first enable signal enters an active state, the first enable signal and the second enable signal are used in the pulse generating circuit, the constant current source and the reference voltage are set to an on state as the first enable signal enters the active state, the comparator is set to an on state as the second enable signal enters the active state, and the pull-up transistor is set to an on state when the second enable signal is in a non-active state.

In the circuit device as described above, it is preferred that the circuit device further includes a discharge transistor which discharges the electric charge which is charged in the capacitor when the first enable signal is in the active state and the second enable signal is in the non-active state.

According to these configurations, as the pull-up transistor which pulls up the output terminal of the comparator is provided, it is possible to prevent a signal of an unstable level from being propagated. Thus, it is possible to allow the constant current source which supplies the input signal of the comparator, the reference voltage and the comparator to become in the off state, and to suppress power consumption in the pulse generating circuit.

Here, a normal signal refers to a signal which is a high level on a high potential side (hereinafter, referred to as "H level") and is a low level on a low potential side (hereinafter, referred to as "L level"). The signal of the unstable level refers to a signal of a level between the H level and the L level.

In this case, for example, the first enable signal may be input to allow the constant current source and the reference voltage to become in the on state, and then, the second enable signal may be input to allow the comparator to become in the on state. The second enable signal may become in the active state in the predetermined time after the first enable signal enters the active state. The predetermined time may be 1 to 1023 cycles of the system clock, or may be a specific time such as several ms, for example.

In a case where the first and second enable signals are input, the pull-up transistor may become in the on state when the second enable signal is in the non-active state. Accordingly, it is possible to reliably prevent the signal of the unstable level from being propagated.

In the circuit device as described above, it is preferred that the pulse generating circuit further includes the discharge transistor which discharges the electric charge in the capacitor, and discharges the electric charge in the capacitor by the discharge transistor in a case where the first enable signal is in the active state and the second enable signal is the non-active state. According to this configuration, the pulse generating circuit can regularly generate the pulse signal.

In the circuit device as described above, it is preferred that the intermittent operation control signal which controls the intermittent operations of the sensor and the amplifier circuit is output on the basis of the pulse signal.

According to this configuration, it is possible to generate a pulse signal which is asynchronous to the system clock. Further, by using a pulse signal which is able to be adjusted in its pulse width as the intermittent operation control signal of the sensor and the amplifier circuit, it is possible to operate the sensor and the amplifier circuit only for a short time, and to suppress power consumption in the sensor and the amplifier circuit.

Further, by integrating the circuit device into a single chip which is an integrated circuit device, it is possible to reduce the size of the circuit device, and to widen its application range.

Another aspect of the invention is directed to an integrated circuit including a circuit device, wherein the circuit device includes an amplifier circuit to which a signal from a sensor is input, and a control circuit which controls the sensor and the amplifier circuit, and an intermittent operation of the sensor and an intermittent operation of the amplifier circuit are controlled by an intermittent operation control signal output from the control circuit, and wherein the intermittent operation control signal includes a first intermittent operation control signal which controls the intermittent operation of the sensor and a second intermittent operation control signal which controls the intermittent operation of the amplifier circuit, and a period when the first intermittent operation control signal enters an active state is different from a period when the second intermittent operation control signal enters an active state.

According to this configuration, since the amplifier circuit which receives the output signal of the sensor and amplifies the signal is also intermittently operated, in addition to the sensor, it is possible to suppress power consumption of the integrated device.

The device according to the aspect of the invention may be configured to include: any one pulse generating circuit as described above; a sensor; an amplifier circuit to which a signal from the sensor is input; and a circuit which calculates a measurement amount detected by the sensor on the basis of an output signal of the amplifier circuit, wherein the pulse generating circuit outputs a first pulse signal and a second pulse signal, wherein a period when the first pulse signal enters an active state is shorter than a period when the second pulse signal becomes an active state, wherein a first intermittent operation control signal which controls an intermittent operation of the sensor is output on the basis of the first pulse signal and a second intermittent operation control signal which controls power supply to the amplifier circuit is output on the basis of the second pulse signal to control an intermittent operation.

The circuit device according to the aspect of the invention gives the intermittent operation control signals which become in the active state at different timings to the sensor and the amplifier circuit, respectively. By considering the unstable output time after start-up of the sensor and the amplifier circuit, that is, the time until the normal signal is output, it is possible to further suppress power consumption.

Specifically, the amplifier circuit takes long time to output the normal signal, compared with the sensor. Thus, the first intermittent operation control signal and the second intermittent operation control signal which enters the active state early by the predetermined period before the first intermittent operation control signal enters the active state, are prepared. Then, the first intermittent operation control signal is supplied to the sensor, and the second intermittent operation control signal is supplied to the amplifier circuit.

At this time, the period when one intermittent operation control signal enters the active state is shorter than the period when the other intermittent operation control signal enters the active state.

Still another aspect of the invention is directed to a detection device including: a circuit device; a sensor; and an MCI) which controls the circuit device, wherein the circuit device includes an amplifier circuit to which a signal from a sensor is input, and a control circuit which controls the sensor and the amplifier circuit, and an intermittent operation of the sensor and an intermittent operation of the amplifier circuit are controlled by an intermittent operation control signal output from the control circuit, and wherein the intermittent operation control signal includes a first intermittent operation control signal which controls the intermittent operation of the sensor and a second intermittent operation control signal which controls the intermittent operation of the amplifier circuit, and a period when the first intermittent operation control signal enters an active state is different from a period when the second intermittent operation control signal enters an active state.

According to this configuration, it is possible to perform accurate measurement even though there is unevenness in manufacturing or change in operation environments, and to suppress power consumption of the detection device by operating the circuit device according to the above aspect of the invention while stopping the operation of the MCU.

Here, the MCU (Micro Controller Unit) serves as a processor, and may include a memory such as a ROM or RAM, a peripheral device associated with interface, or the like, for example. Further, the MCU controls the circuit device, and may integrate the measurement amounts detected by the sensor and may display the result on a display section or the like, for example.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings. The drawings are shown for ease of description, and all components necessary for forming a device are not necessarily disclosed.

1. First Embodiment

A first embodiment of the invention will be described with reference to FIGS. 1 to 5, and 9. Hereinafter, a pulse generating circuit according to the first embodiment will be firstly described, and then, a circuit device and a detection device which include the pulse generating circuit according to the first embodiment will be described.

Figure 1:
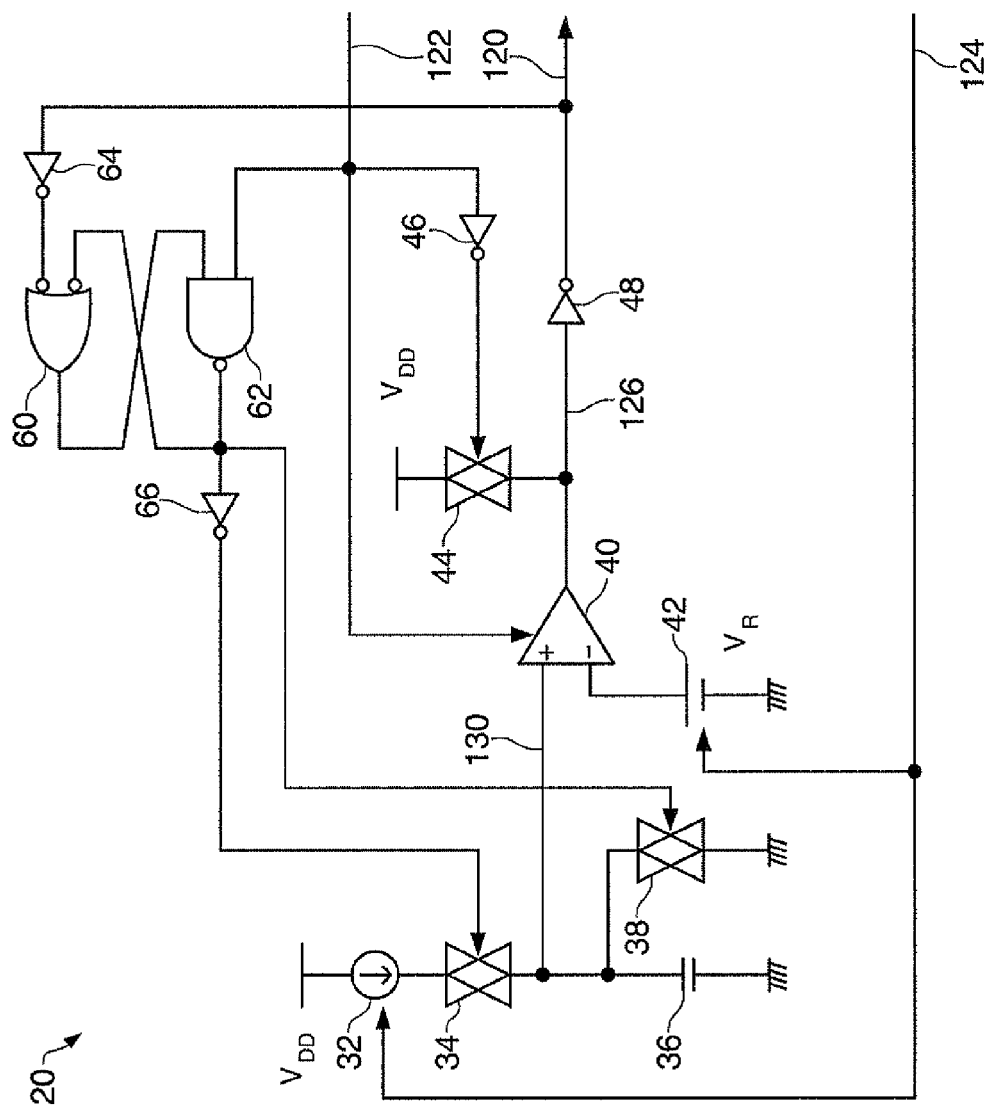
FIG. 1 is an example of a circuit diagram illustrating a pulse generating circuit according to a first embodiment of the invention.

1.1. Configuration of Pulse Generating Circuit According to the Present Embodiment FIG. 1 is a circuit diagram illustrating a pulse generating circuit 20 according to the present embodiment. The pulse generating circuit 20 includes a constant current source 32, a capacitor 36, and a comparator 40.

The constant current source 32 allows electric current of a predetermined current value to flow when a transmission gate 34 is in an on state.

The capacitor 36 includes one terminal (first terminal) which is grounded and the other terminal (second terminal) which is connected to the constant current source 32 through the transmission gate 34. Accordingly, when the transmission gate 34 is in the on state, the capacitor 36 is gradually charged with electric charge.

The second terminal of the capacitor 36 is connected to a transmission gate 38 in parallel. When the transmission gate 38 is in an on state, electric charge of the capacitor 36 is discharged. That is, the transmission gate 38 serves as a transistor for discharge, and is thus referred to as a discharge transistor 38, hereinafter.

The comparator 40 compares the level of a charge voltage 130 which is a voltage based on electric charge charged in the capacitor 36 with the level of a reference voltage 42. In the present embodiment, the reference voltage 42 is a predetermined voltage value $V_R$. For example, in a case where the charge voltage 130 is smaller than the voltage value $V_R$, a comparator output signal 126 becomes an L level. Further, an output pulse signal 120 which is obtained by inverting this signal by an inverter 48 becomes an H level.

An output terminal of the comparator 40 is connected to a transmission gate 44. The comparator output signal 126 is pulled up to the H level when the transmission gate 44 is in an on state. That is, the transmission gate 44 serves as a transistor for pull-up, and is thus referred to as a pull-up transistor 44, hereinafter.

Here, in order to suppress power consumption, the pulse generating circuit 20 may include an element which is in an off state when not used. In the present embodiment, the constant current source 32 and the reference voltage 42 are in the on state by a pulse power enable signal 124 which is a first enable signal. The pulse power supply enable signal 124 is a signal which enters an active state when the pulse generating circuit 20 is used.

Further, in the present embodiment, the comparator 40 enters an on state by a pulse generation enable signal 122 which is a second enable signal. The pulse generation enable signal 122 enters an active state in a predetermined period of time (several cycles in a system clock, for example) after the pulse power supply enable signal 124 enters the active state. Thus, after a sufficient set-up time, the output from the comparator 40 (that is, the output of the output pulse signal 120) is started.

The pulse generating circuit 20 according to the present embodiment includes a flip-flop which includes NAND circuits 60 and 62 and an inverter 64. The output of the flip-flop is inverted by an inverter 66. This flip-flop retains a value corresponding to a combination of the pulse generation enable signal 122 and the output pulse signal 120. According to the value retained by the flip-flop, the capacitor 36 charges or discharges electric charge.

For example, when an output value of the inverter 66 is an H level, the transmission gate 34 enters the on state, and the capacitor 36 charges electric charge. Contrarily, when the output value of the inverter 66 is an L level and the output of the flip-flop is an H level, the discharge transistor 38 enters the on state, and the capacitor 36 discharges electric charge.

In the present embodiment, the pull-up transistor 44 is controlled by the pulse generation enable signal 122. When the pulse generation enable signal 122 is in a non-active state (here, L level), since the comparator 40 enters the off state, it is necessary to pull up its output terminal. The pulse generating circuit 20 according to the present embodiment inverts the pulse generation enable signal 122 by the inverter 46 to be connected to the pull-up transistor 44, to thereby realize this operation.

1.2. Output of Comparator in Intermittent Operation

Figure 2A:
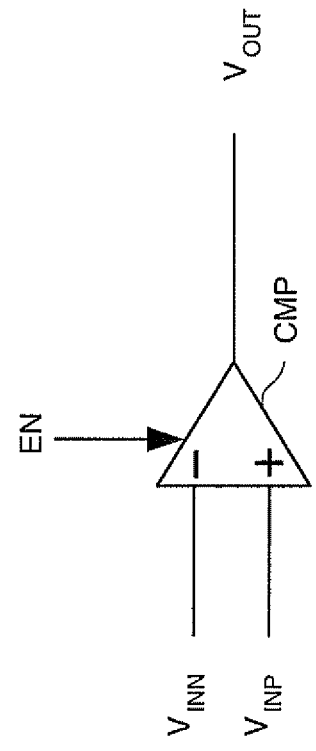
FIGS. 2A and 2B are diagrams illustrating behaviors up to a normal output start in an intermittent operation.
Figure 2B:
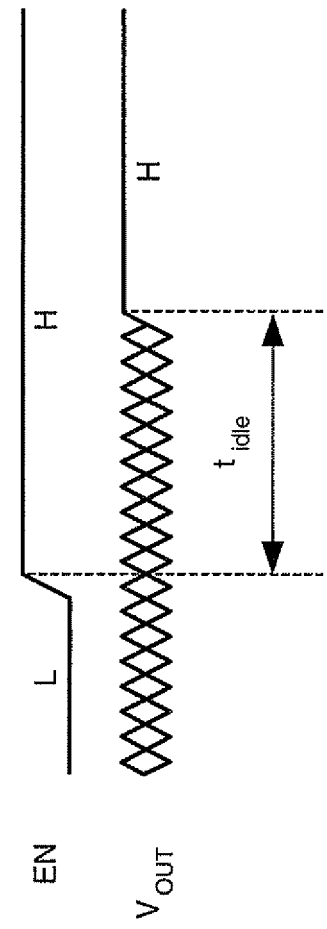

FIGS. 2A and 2B are diagrams illustrating operations in the intermittent operation of a comparator CMP. If the comparator is intermittently operated, it is possible to suppress power consumption. FIG. 2A shows a configuration of the comparator CMP. The comparator CMP includes an inverted input terminal to which a signal $V_{INN}$ is input, a non-inverted input terminal to which a signal $V_{INP}$ is input, an output terminal from which an output signal $V_{OUT}$ is output, and an enable terminal which receives an enable signal EN. When the enable signal EN is an L level, for example, the comparator is not operated (off state), and thus, power supply is also not necessary and electric power is not consumed.

However, in a case where the comparator CMP is in the off state, a signal of an unstable level may propagate as the output signal $V_{OUT}$. In a case where the comparator CMP is started up, it takes a predetermined time until a normal signal is output. That is, after the comparator CMP is started up, an unstable output time is present.

FIG. 2B is an example of the output signal $V_{OUT}$ of the comparator CMP. As the enable signal EN is changed to an H level from an L level, the comparator CMP is started up. However, the output signal $V_{OUT}$ outputs the signal of the unstable level until the comparator CMP is started up. Further, even after the comparator CMP is started up, until the output signal $V_{OUT}$ outputs the H level which is the normal signal, an unstable output time $t_{idle}$ is present. When the intermittent operation is performed in the circuit including the comparator, it is necessary to consider a period when the normal signal is not output. Voltages applied to the input terminals in this example become $V_{INP} > V_{INN}$.

For example, in the pulse generating circuit 20 shown in FIG. 1, the on state and the off state of the comparator 40 are switched by the pulse generation enable signal 122. Further, when the comparator 40 is in the off state, the pull-up transistor 44 is provided so that the signal of the unstable level is not propagated.

Further, for example, in the detection device or the like including the sensor, an output of an amplifier circuit which receives an analog signal from the sensor may be sampled. In this case, it is necessary to consider that the unstable output time is changed by unevenness in manufacturing, for example. Thus, in order to obtain appropriate data even though the unstable output time is changed, it is necessary that a pulse signal which gives a sampling timing be very accurate.

Here, if the pulse signal is synchronized with the system clock, the pulse signal gives an accurate timing, but in a case where the frequency of the system clock is low, it takes time for sampling. For this reason, detection performance of the detection device becomes poor, and the period of time when the sensor or the like is started up becomes long, and thus, the power consumption suppression effect disappears.

Accordingly, as the pulse signal of giving the timing when the output of the amplifier circuit is sampled, a signal which is asynchronous to the system clock and gives an accurate timing is necessary. Since the pulse generating circuit according to the present embodiment generates a pulse signal which is asynchronous to the system clock and changes at least one of a current value of the constant current source, capacitance of the capacitor, a voltage value of the reference voltage, it is possible to easily and accurately adjust the timing of the pulse signal.

Figure 9:
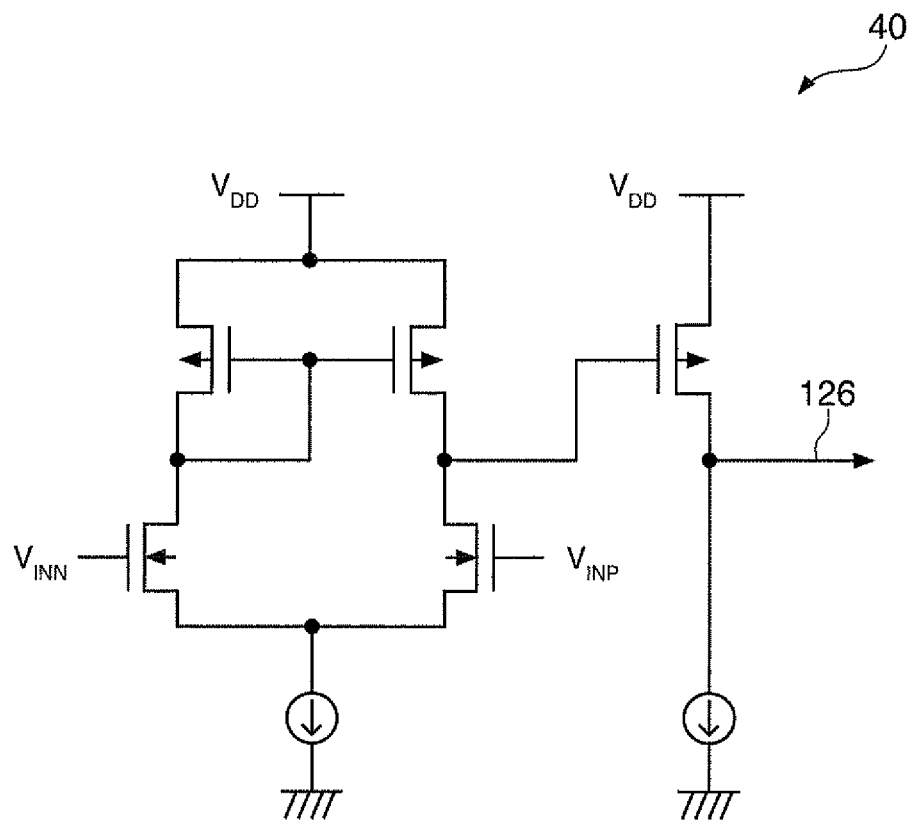
FIG. 9 is a diagram illustrating a configuration example of a comparator.

Here, the comparator according to the present embodiment has a configuration shown in FIG. 9, for example. In the comparator 40 in the present embodiment, two N-type transistors which receive the non-inverted input $V_{INP}$ and the inverted input $V_{INN}$, two P-type transistors which form a current mirror circuit, a P-type transistor which serves as a switch according to the magnitude relationship of the non-inverted input $V_{INP}$ and the inverted input $V_{INN}$ and a constant current source, are connected to each other, as shown in FIG. 9.

The comparator 40 according to the present embodiment has a small through rate when the comparator output signal 126 is changed to the L level from the H level. Thus, the effects of low power consumption and circuit size reduction are obtained.

Figure 3:
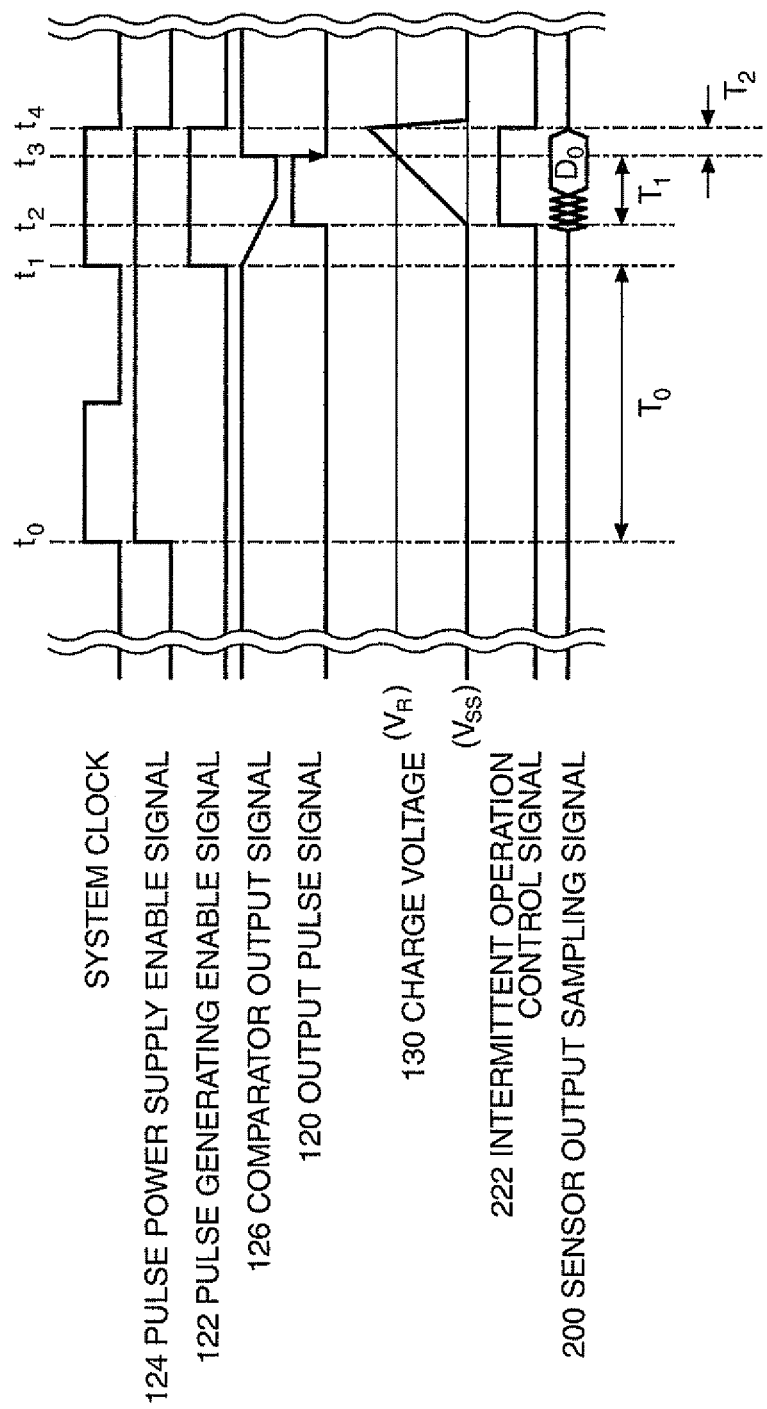
FIG. 3 is a waveform diagram illustrating an output pulse signal or the like according to the first embodiment.

Here, the comparator output signal 126 is smoothly changed to the L level from the H level (see change between times $t_1$ and $t_3$ of the comparator output signal 126 in FIG. 3). Thus, there is a possibility that through current flows in the inverter 48 at the rear stage (see FIG. 1), but it is possible to reduce the through current by designing the gate length to be long. Accordingly, by using the comparator 40 in FIG. 9, it is possible to achieve the effects of low power consumption and circuit size reduction of the pulse generating circuit 20.

1.3. Waveform Diagram

FIG. 3 is a waveform diagram of the pulse generating circuit according to the present embodiment. Referring to FIG. 3, it is possible to easily and accurately adjust the timing of the output pulse signal 120. The same reference numerals are given to the same signals as in FIG. 1, and their description will be omitted.

The system clock in FIG. 3 is a clock which is used by the pulse generating circuit and a system which includes the pulse generating circuit. The pulse generating circuit generates the output pulse signal 120 which is asynchronous to the system clock.

Firstly, at time $t_0$, the pulse power supply enable signal 124 enters the active state, and the constant current source 32 and the reference voltage 42 in FIG. 1 become in the on state. Further, at time $t_1$, the pulse generation enable signal 122 enters the active state, using a period $T_0$ corresponding to one cycle of the system clock as a set up period.

The comparator 40 (see FIG. 1) is started up by the pulse generation enable signal 122. At time $t_1$, the comparator output signal 126 is the H level, under the influence of the pull-up transistor 44 (see FIG. 1) which was in the on state immediately before.

If the pulse generation enable signal 122 is changed to the H level, the comparator 40 starts the operation. At time $t_1$, since the charge voltage 130 is the L level and is lower than the reference voltage ($V_R$), the comparator output signal 126 is gradually changed to the L level, and changes the output pulse signal 120 to the H level at time $t_2$. Further, the output of the flip-flop is changed, the transmission gate 34 enters the on state, and the charge voltage 130 begins to increase.

The comparator 40 (see FIG. 1) compares the charge voltage 130 with the reference voltage ($V_R$). Further, at time $t_3$ when the charge voltage 130 exceeds the reference voltage ($V_R$), the comparator output signal 126 is changed to the H level. Further, the output pulse signal 120 is inverted to the L level. This timing has nothing to do with time $t_4$ of a trailing edge of the system clock, for example. Accordingly, the pulse generating circuit is able to output the output pulse signal 120 which is asynchronous to the system clock.

In this way, in the pulse generating circuit according to the present embodiment, the timing of the output pulse signal 120 is determined by the relationship between the charge voltage 130 and the reference voltage ($V_R$). Thus, by adjusting at least one of the current value of the constant current source which determines the change in the charge voltage 130 and the capacitance of the capacitor, in shipping, for example, it is possible to generate an accurate pulse signal. Further, by adjusting the voltage value $V_R$ of the reference voltage, it is also possible to generate an accurate pulse signal.

Since the pulse generating circuit according to the present embodiment is able to generate the pulse signal which is asynchronous to the system clock and can be easily and accurately adjusted, the pulse generating circuit can be applied to the detection device or the like as described later. For example, in the detection device which includes the sensor, an intermittent operation control signal (intermittent operation control signal 222) which turns on electric power of the sensor or the amplifier circuit may be used. In this case, by generating the intermittent operation control signal 222 on the basis of the output pulse signal 120, it is possible to allow the sensor or the like to be in the on state only when necessary, and to suppress power consumption.

Here, if the amplifier circuit is a comparator, the individual detection devices may have different unstable output times. Then, it is necessary to provide an accurate pulse signal which gives a timing of the period $T_1$ when the sensor output sampling signal 200 sufficiently becomes stable, while remaining a sufficient hold period $T_2$.

In the pulse generating circuit according to the present embodiment, by changing at least one of the current value of the constant current source, the capacitance of the capacitor, and the voltage value of the reference voltage, it is possible to easily and accurately adjust the timing of the pulse signal. Thus, this pulse generating circuit can be appropriately applied to the detection device as described later.

Figure 5:
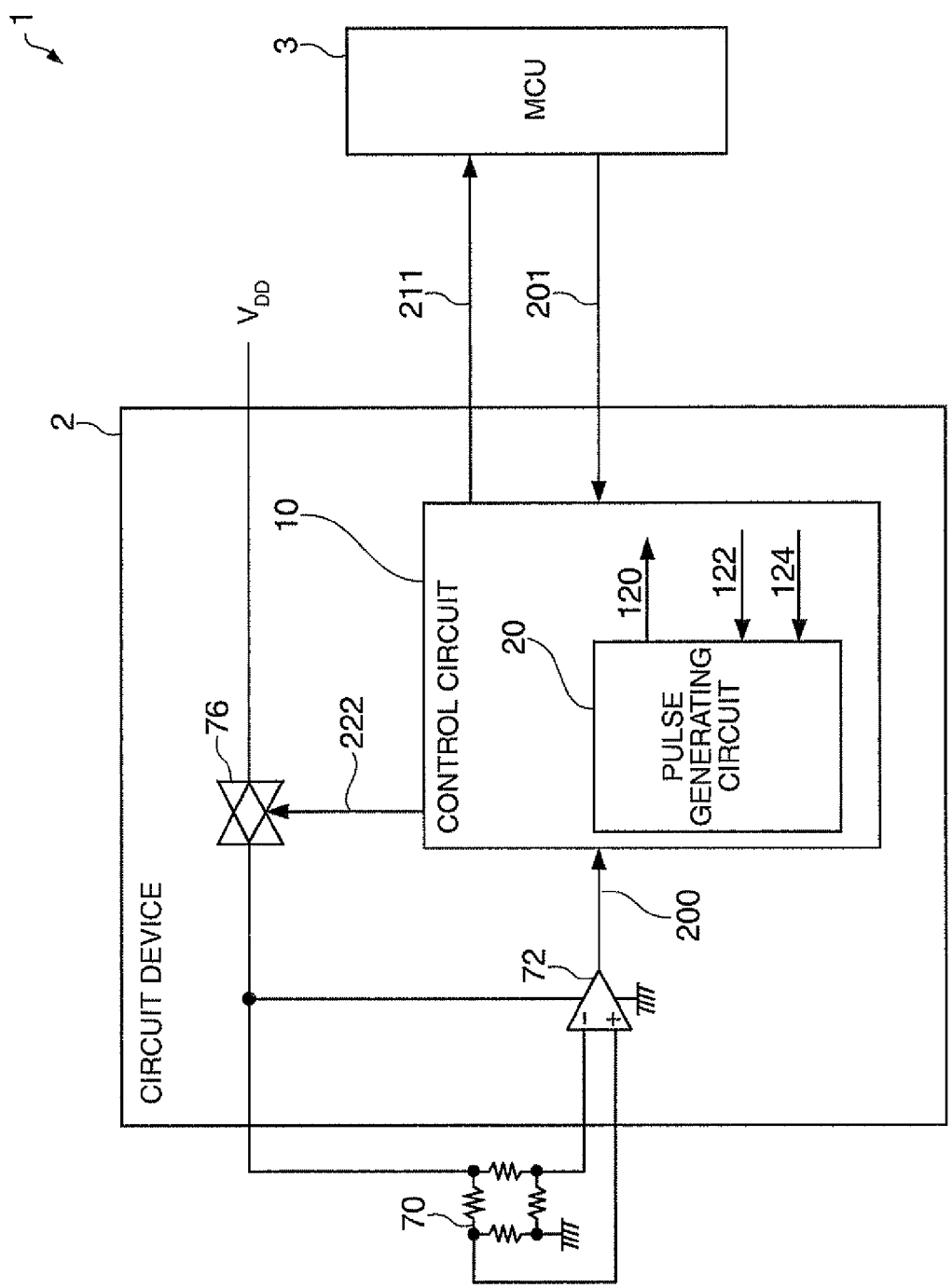
FIG. 5 is a diagram illustrating a circuit device and a detection device which include a pulse generating circuit according to the first embodiment.

The intermittent operation control signal 222 and the sensor output sampling signal 200 correspond to the signals having the same reference numerals in a block diagram of FIG. 5.

1.4. Operation of Rotation Detection Device

Figure 4A:
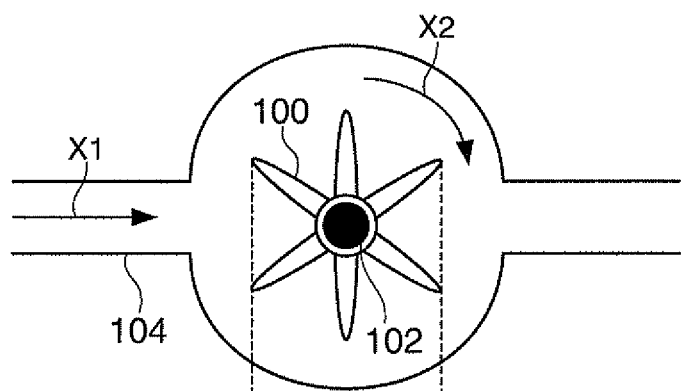
FIG. 4A is a top view illustrating a flow path in which a rotation detection device is installed.
Figure 4B:
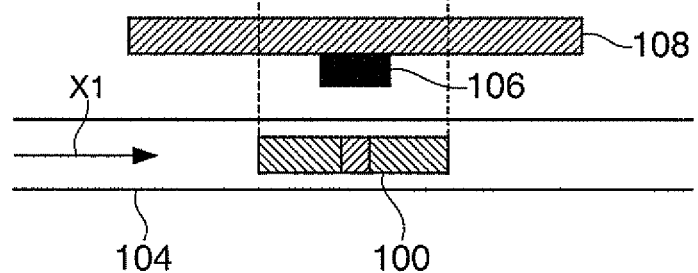
FIG. 4B is a partial cross-sectional view thereof.

Here, a rotation detection device which is a kind of detection device will be described with reference to FIGS. 4A and 4B. FIG. 4A is a top view illustrating a flow path in which the rotation detection device is installed, and FIG. 4B is a partial cross-sectional view thereof. In FIG. 4A, a magnetic sensor which is a kind of sensor is not shown.

The rotation detection device replaces the amount which is measured (measurement amount) with a rotation number, detects the rotation number by a magnetic sensor, for example, and outputs an electric signal. The electric signal is processed by an MCU, for example, to obtain the measurement amount. The measurement amount may be the flow rate of a liquid such as water, or may be the flow rate of a gaseous body such as gas. Hereinafter, the rotation detection device which measures the flow rate of a liquid will be described. For example, the liquid may be water, and in this case, the rotation detection device may be applied to a water meter.

In FIG. 4A, a rotor 100 is installed in a flow path 104 of a liquid. In a case where the liquid flows in the direction of arrow X1, the rotor 100 rotates in the clockwise direction as indicated by arrow X2. The flow rate of the liquid can be known by measuring the rotation number. Here, a magnet 102 is attached to a shaft of the rotor 100, in which its magnetism is changed as the rotor 100 rotates.

FIG. 4B is a cross-sectional view of the flow path 104 of the liquid in FIG. 4A. A magnetic sensor 106 is attached to a substrate 108, in the proximity of the rotor 100. Here, the magnetic sensor 106 is not in contact with the rotor 100. The magnetic sensor 106 detects the magnetism which is changed by the magnet 102 as the rotor 100 rotates. Further, the magnetic sensor 106 outputs an electric signal on the basis of the detection result, and for example, an MCU (not shown) attached to the substrate 108 receives the signal to calculate the rotation number. Further, the MCU calculates the flow rate of the liquid on the basis of the rotation number.

For example, the rotation detection device such as a water meter may be driven by a battery. Thus, in order to operate the rotation detection device by the battery for a long time, it is strongly necessary to reduce power consumption. Further, in order to achieve accurate measurement, it is necessary to sample the output of the sensor at a suitable timing. Thus, by assembling the pulse generating circuit according to the present embodiment as the detection device or the circuit device including the detecting circuit, it is possible to perform an accurate sampling with low power consumption as described later.

1.5. Circuit Device and Detection Device

FIG. 5 illustrates a circuit device 2 and a detection device 1 which include the pulse generating circuit 20 according to the present embodiment. The same reference numerals and signs are given to the same components as in FIGS. 1 and 3, and their description will be omitted. The detection device 1 according to the present embodiment is the rotation detection device as described above, but the invention is not limited thereto.

As shown in FIG. 5, the pulse generating circuit 20 is included in a control circuit 10. Here, the control circuit 10 may be integrated into a single chip as the circuit device 2 which is an integrated circuit device, together with a sensor 70, an amplifier circuit 72 and a transmission gate 76. The transmission gate 76 is operated as a switch circuit. This switch circuit may employ a different circuit configuration.

The sensor 70 is a magnetic sensor which detects change in magnetism, and hereinafter, the sensor 70 is referred to as a sensor. Further, the amplifier circuit 72 receives an output of the sensor, and converts the output into the sensor output sampling signal 200 to output the result. The amplifier circuit 72 may employ an operational amplifier. Further, the amplifier circuit 72 may be a comparator. A plurality of sensors and a plurality of amplifier circuits may be provided.

In order to suppress power consumption, the circuit device 2 intermittently operates the amplifier circuit in addition to the sensor. In this case, by switching the on state of the transmission gate and the off state thereof by the intermittent operation control signal 222, the control circuit 10 controls the intermittent operation to the sensor and the amplifier circuit. In the present embodiment, only when the intermittent operation control signal 222 is 1, the transmission gate 76 enters the on state, and a valid signal as the sensor output sampling signal 200 is input to the control circuit 10. Since the amplifier circuit in addition to the sensor does not consume electric power, it is possible to reduce power consumption.

In this regard, the control circuit 10 generates the intermittent operation control signal 222 on the basis of the output pulse signal 120 from the pulse generating circuit 20, and samples the sensor output sampling signal 200 on the basis of the output pulse signal 120 (see FIG. 3).

Since it is possible to allow the sensor or the like to become in the on state only for a minimum time necessary for sampling data from the sensor, it is possible to suppress power consumption. Further, in the pulse generating circuit 20 according to the present embodiment, it is possible to easily and accurately adjust the timing of the output pulse signal 120 by changing at least one of the current value of the constant current source, the capacitance of the capacitor, and the voltage value of the reference voltage. Thus, it is possible to perform sampling when the sensor output sampling signal 200 is sufficiently stabilized.

Here, the detection device 1 includes an MCU 3, in addition to the circuit device 2. The circuit device 2 may output an interrupt signal 211 according to rotation or rotation stop. The MCU 3 may calculate an integrated value of the flow rate, for example, using a counter or the like, on the basis of the interrupt signal 211. A plurality of interrupt signals 211 may be provided according to forward rotation, backward rotation, rotation stop, and the like.

In the detection device 1, the control circuit 10 gives the pulse power supply enable signal 124 or the pulse generation enable signal 122 to the pulse generating circuit 20 on the basis of the control signal 201 from the MCU 3.

In this way, since the pulse generating circuit according to the present embodiment can easily and accurately adjust the timing of the pulse signal, the pulse generating circuit can be appropriately applied to the detection device 1 or its circuit device 2.

2. Second Embodiment

A second embodiment of the invention will be described with reference to FIGS. 6 to 8. In a circuit device of the second embodiment, by generating and outputting a plurality of intermittent operation control signals, it is possible to further suppress power consumption in a case where the circuit device is applied to the detection device 1 or the like. The number of the intermittent operation control signals may be three or more, but in the present embodiment, it is assumed that the number is two.

2.1. Configuration of Pulse Generating Circuit According to the Present Embodiment A pulse generating circuit according to the present embodiment will be described with reference to FIG. 6. FIG. 6 is a circuit diagram illustrating a pulse generating circuit 20A according to the present embodiment. The same reference numerals and signals are given to the same components as in FIGS. 1 to 5, and their description will be omitted.

The pulse generating circuit 20A includes two comparators 40A and 40B. A first comparator output signal 126A and a second comparator output signal 126E which are outputs of the comparators 40A and 40B, respectively, are output as a first output pulse signal 120A which is a first pulse signal, and a second output pulse signal 120B which is a second pulse signal, respectively, through a logic circuit.

Here, two comparators 40A and 40B compare a charge voltage 130 with a reference voltage. Here, two comparators 40A and 40B use different reference voltages (a first reference voltage 42A and a second reference voltage 42B). For example, the first reference voltage 42A of the comparator 40A may be a voltage value to $V_{R0}$, and the second reference voltage 42B of the comparator 40B may be a voltage value to $V_{R1}$ ($>V_{R0}$).

In the present embodiment, the second output pulse signal 120B is obtained by inverting the second comparator output signal 126E by the inverter 48. Further, the first output pulse signal 120A is an output signal of an AND circuit 49 which receives the input of the second output pulse signal 120B and the first comparator output signal 126A. In this way, it is possible to generate the output pulse signal by combination of a plurality of signals.

In this regard, the comparators 40A and 40B may also have the configuration as shown in FIG. 9, for example. In the present embodiment, since two comparators 40A and 40B are used, it is possible to output the first output pulse signal 120A and the second output pulse signal 120B.

The pulse generating circuit 20A according to the present embodiment is able to output two pulse signals having different timings. For example, if a plurality of intermittent operation control signals is generated on the basis of these pulse signals, it is possible to perform the intermittent operation for each circuit supplied with the intermittent operation control signal without loss, and to possible to further suppress power consumption.

Pull-up transistors 44A and 44B which are transmission gates are connected to the respective output terminals of two comparators 40A and 40B. Thus, a signal of an unstable level is prevented from being propagated. The pull-up transistors 44A and 44B become in the on state, respectively, when a signal obtained by inverting the pulse generation enable signal 122 by the inverters 46A and 46B is an H level.

2.2. Waveform Diagram

Figure 6:
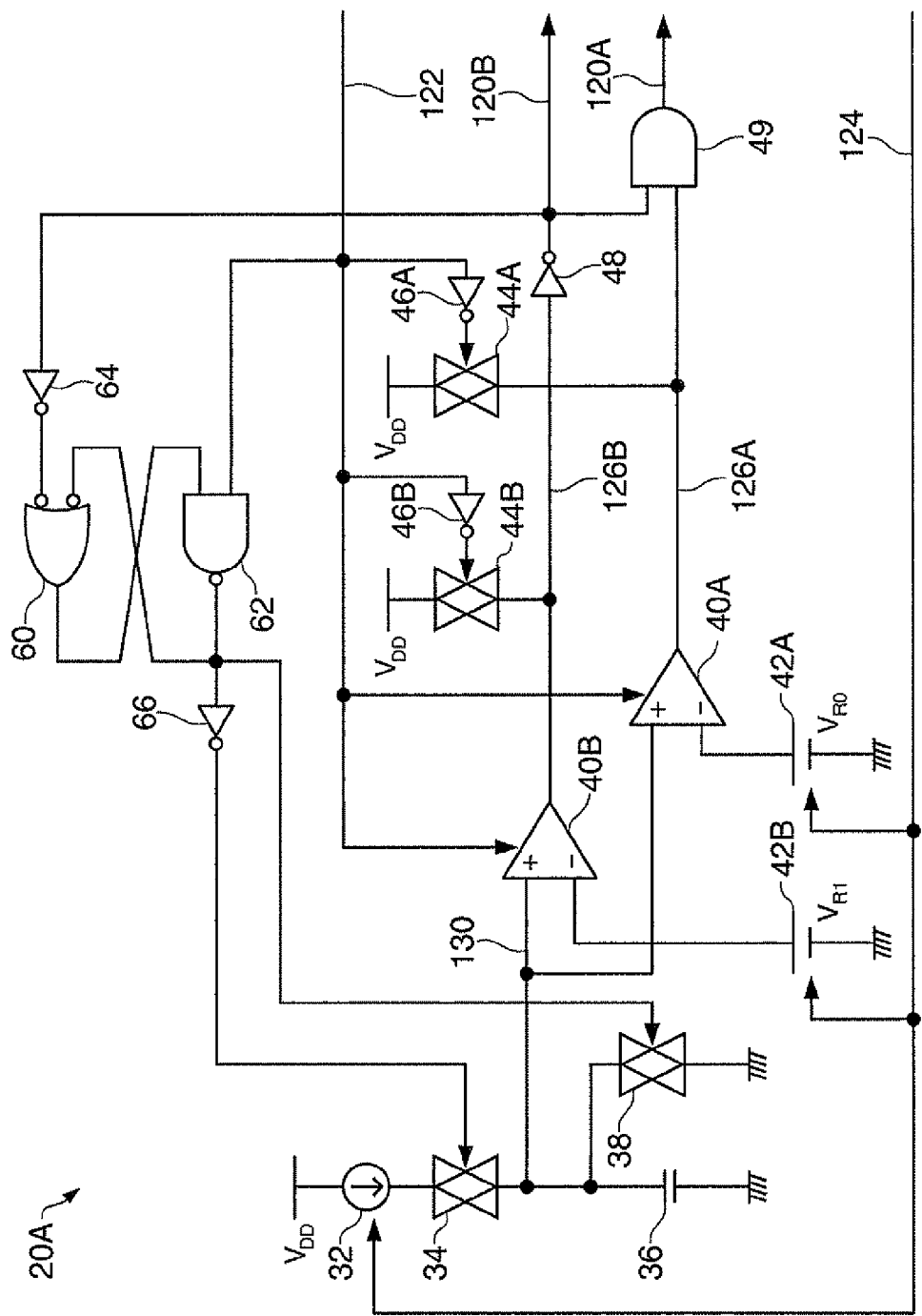
FIG. 6 is an example of a circuit diagram illustrating a pulse generating circuit according to a second embodiment.
Figure 7:
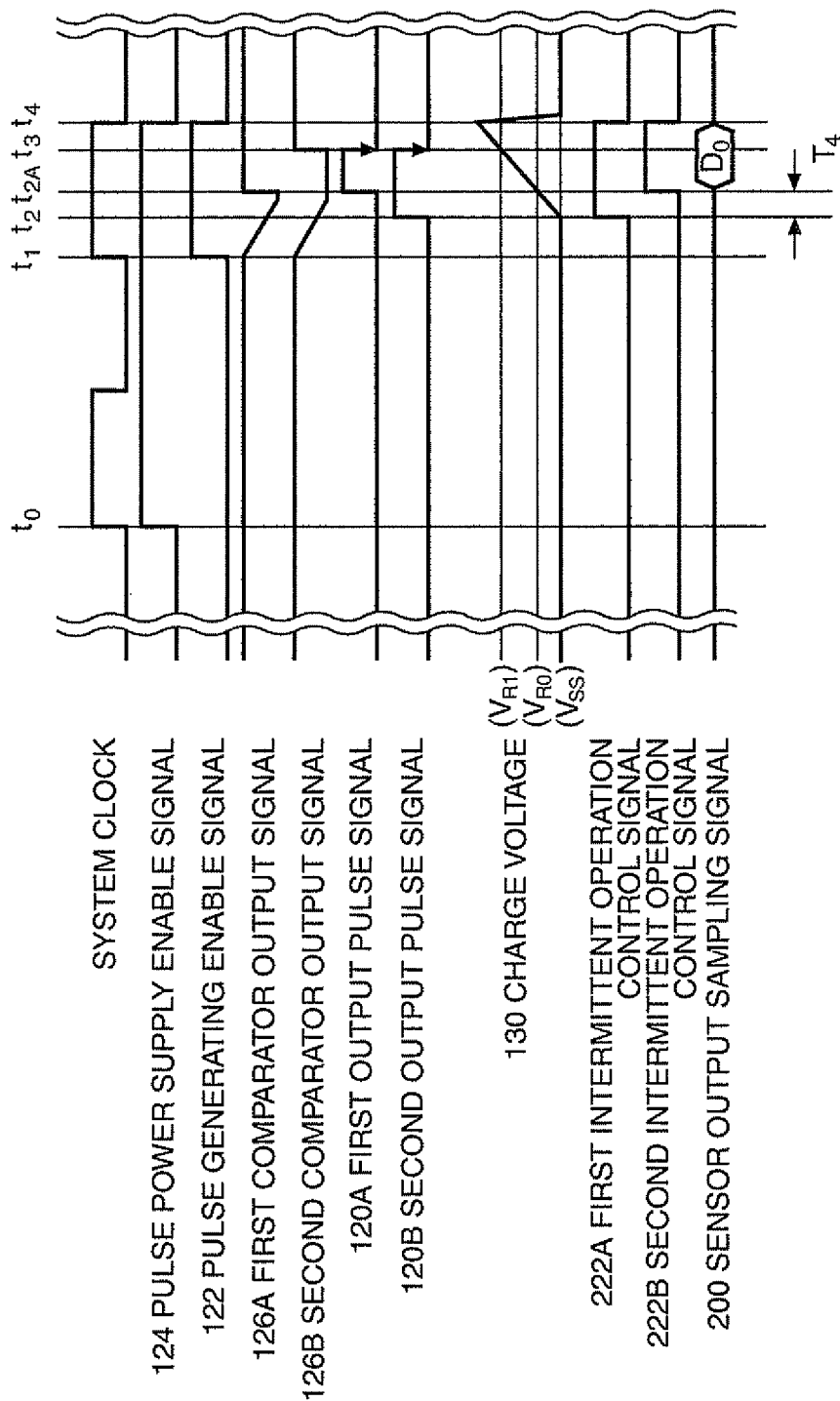
FIG. 7 is a waveform diagram illustrating an output pulse signal or the like according to the second embodiment.

FIG. 7 is a waveform diagram illustrating the pulse generating circuit according to the present embodiment. The same reference numerals are given to the same signals as in FIGS. 1, 3 and 6, and their description will be omitted.

The pulse generating circuit generates output pulse signals 120A and 120B which are asynchronous to the system clock.

In a similar way to the first embodiment (see FIG. 3), at time $t_1$, the first comparator output signal 126A and the second comparator output signal 126B are the H level, under the influence of the pull-up transistors 44A and 44B (see FIG. 6) which was in the on state immediately before.

If the pulse generation enable signal 122 is changed to the H level, the comparators 40A and 40B start the operation. Since the second reference voltage 42B is a voltage higher than the L level of the charge voltage 130, the second comparator output signal 126E is gradually changed to the L level, and changes the second output pulse signal 120B to the H level at time $t_2$. Further, the transmission gate 34 enters the on state, and the charge voltage 130 begins to increase.

The first comparator output signal 126A is changed to the H level at time $t_{2A}$ when the charge voltage 130 exceeds the first reference voltage ($V_{R0}$). Further, the first output pulse signal 120A is changed to the L level.

At time $t_3$ when the charge voltage 130 exceeds the second reference voltage ($V_{R1}$), the second comparator output pulse signal 126B is also changed to the H level. Here, both of the first output pulse signal 120A and the second output pulse signal 120B are changed to the L level.

In this way, if the timings when the comparator output signals are inverted are different due to the difference in the reference voltages, two different output pulse signals (first output pulse signal 120A and second output pulse signal 120B) are generated through the AND circuit 49 in FIG. 6, for example.

If the intermittent operation control signal is generated on the basis of each of the output pulse signals 120A and 120B, it is possible to perform the intermittent operation for each circuit without loss, and to further suppress power consumption.

Specifically, in the case of a circuit in which it takes time until a normal signal is output, a first intermittent operation control signal 222A which enters an active state early is supplied to the circuit. Further, in the case of a circuit (for example, sensor) in which a normal signal is immediately output, a second intermittent operation control signal 222B which enters an active state in a predetermined period $T_4$ after the first intermittent operation control signal 222A enters the active state is supplied to the circuit.

In the present embodiment, the first intermittent operation control signal 222A is a second intermittent operation control signal which is generated on the basis of the second output pulse signal 120B, and the second intermittent operation control signal 222B is a first intermittent operation control signal which is generated on the basis of the first output pulse signal 120A.

2.3. Circuit Device and Detection Device

Figure 8:
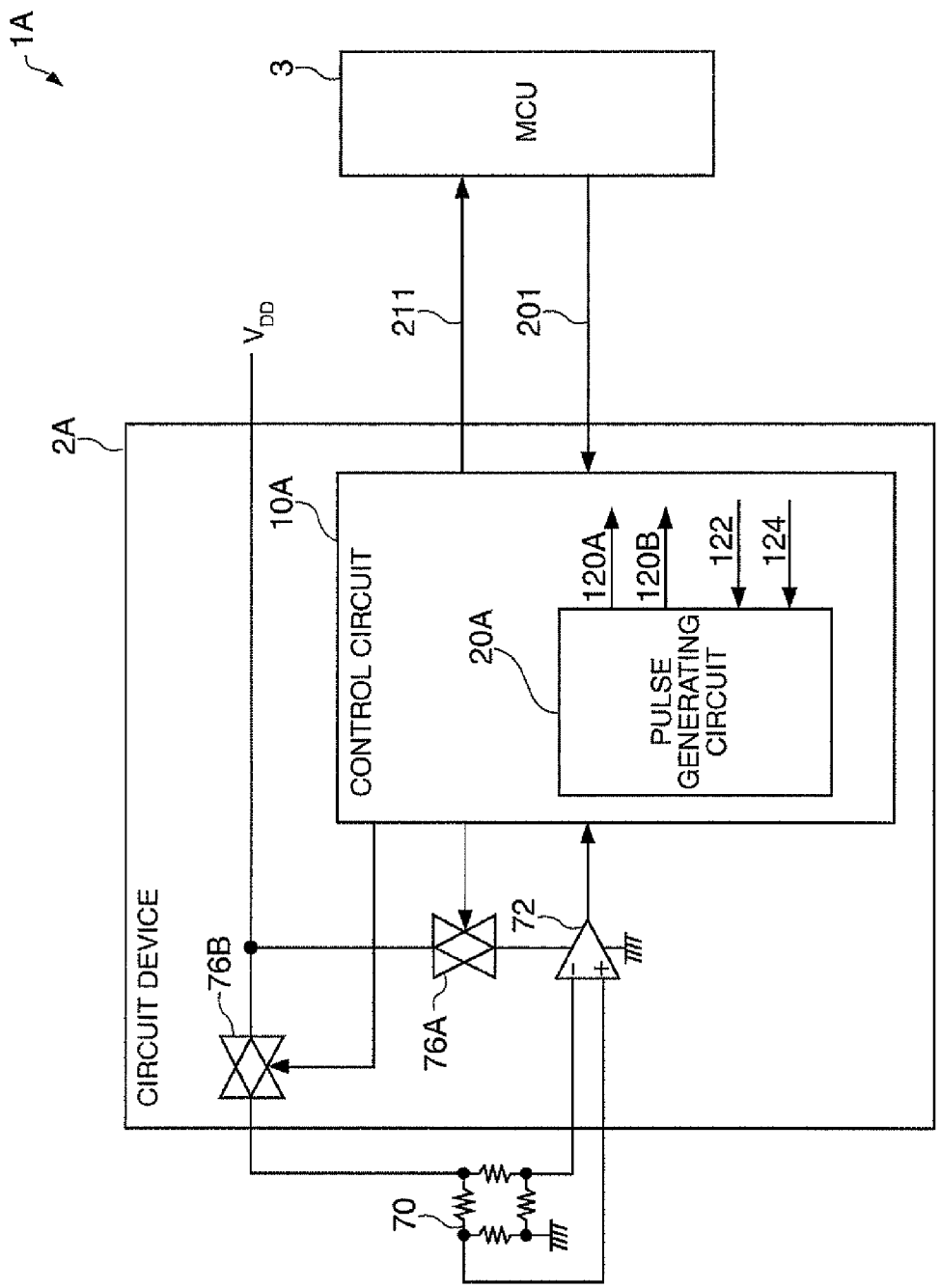
FIG. 8 is a diagram illustrating a circuit device and a detection device which include a pulse generating circuit according to the second embodiment.

FIG. 8 is diagram illustrating a circuit device 2A and a detection device 1A which include the pulse generating circuit 20A according to the present embodiment. The same reference numerals and signals are given to the same components as in FIGS. 1, 3, 5 to 7, and their description will be omitted. The detection device 1A according to the present embodiment is the same rotation detection device in the first embodiment, but the invention is not limited thereto.

As shown in FIG. 8, a control circuit 10A includes the pulse generating circuit 20A, and may be used as a part of the detection device 1A. Here, an amplifier circuit 72, transmission gates 76A and 76B, and the control circuit 10A may be integrated into a single chip as the circuit device 21 which is an integrated circuit.

The pulse generating circuit 20A outputs two pulse signals (first output pulse signal 1201 and second output pulse signal 120B) having different timings to the control circuit 10A. Further, as described above, the control circuit 10A generates the first intermittent operation control signal 2221 on the basis of the second output pulse signal 120B, and generates the second intermittent operation control signal 222B on the basis of the first output pulse signal 120A.

Even though the unstable output time $t_{idle}$ is present at the start-up time in the amplifier circuit 72 as shown in FIG. 2B and the sensor is operated during this time, correct data is not transmitted to the control circuit 10A. That is, a settling time is necessary until the output is stabilized. In a case where the settling time of the sensor is shorter than the settling time of the amplifier circuit 72, it is possible to further reduce power consumption by allowing the sensor to become in the off state at the unstable output time $t_{idle}$ of the amplifier circuit 72.

Thus, by preparing the first intermittent operation control signal 222A and the second intermittent operation control signal 222B, it is possible to change the timings when the amplifier circuit and the sensor become in the on state, to thereby suppress power consumption of the detection device 1A.

Specifically, the first intermittent operation control signal 222A is input to the transmission gate 76A to start up the amplifier circuit 72 on the basis of the timing of time $t_2$ in FIG. 7. On the other hand, the second intermittent operation control signal 222B is input to the transmission gate 76B to start up the sensor on the basis of the timing of time $t_{2A}$ in FIG. 7. In this regard, since the sensor is not started up at the unstable output time of the amplifier circuit 72, it is possible to suppress power consumption without loss due to the operation of the detection device 1A.

The invention is not limited to the embodiments as described above, and the invention includes substantially the same configuration as the configuration described in the embodiments and the substantially same configuration (for example, a configuration which has the same function, the same way and the same result, or a configuration which has the same object and the same effect).

For example, in the above description, the settling time of the sensor is shorter than the settling time of the amplifier circuit 72, but contrarily, in a case where the settling time of the sensor is longer than the settling time of the amplifier circuit 72, a configuration may be adopted in which the intermittent operation of the amplifier circuit 72 starts after a predetermined time elapses from the start of the intermittent operation of the sensor.

For example, in the present embodiments or the modification examples, the magnetic sensor is used, but the invention is not limited to the magnetic sensor, and a pressure sensor, an illumination sensor, a temperature sensor may be used.

Further, the amplifier circuit 72 may employ an operational amplifier, a comparator, and an analog digital conversion circuit.

For example, the transmission gates 76, 76A and 76B control the intermittent operation as power supply switches, but a sensor or an amplifier circuit having the switch functions may be used. Further, the control circuit 10, the control circuit 10A, the circuit device 2 or the circuit device 2A may be provided in the MCU.

Further, the invention includes a configuration in which a part which is not essential in the configuration described in the embodiments is replaced. Further, the invention includes a configuration which achieves the same effects or a configuration which can achieve the same object as in the configuration described in the embodiments. Further, the invention includes a configuration obtained by adding the related art technology to the configuration described in the embodiments. The invention may have a variety of application examples within a range without departing from the spirit of the invention.

What is claimed is:

1. A circuit device comprising:
   an amplifier circuit to which a signal from a sensor is input; and
   a control circuit which controls the sensor and the amplifier circuit,
   an intermittent operation of the sensor and an intermittent operation of the amplifier circuit being controlled by an intermittent operation control signal output from the control circuit, and
   the intermittent operation control signal including a first intermittent operation control signal that controls the intermittent operation of the sensor and a second intermittent operation control signal that controls the intermittent operation of the amplifier circuit, wherein
   the first intermittent operation control signal enters the active state in a predetermined period after the second intermittent operation control signal enters the active state, and
   a settling time of the sensor is shorter than a settling time of the amplifier circuit.

2. The circuit device according to claim 1, further comprising:

a switch which is able to switch power supply on/off with respect to the sensor and the amplifier circuit, wherein the intermittent operation control signal is output to the switch, and is used to control the switch of the power supply on/off.

3. The circuit device according to claim 1, wherein the control circuit includes a pulse generating circuit, wherein the pulse generating circuit includes a constant current source which generates electric current of a predetermined current value, a capacitor which is charged with electric charge by the electric current from the constant current source, and a comparator, and wherein the comparator outputs a pulse signal on the basis of a result obtained by comparing a voltage based on the electric charge charged in the capacitor with a reference voltage having a predetermined voltage value.

4. The circuit device according to claim 3, wherein the pulse generating circuit further includes a pull-up transistor, and wherein the pull-up transistor pulls up an output terminal of the comparator to a power potential on a high potential side.

5. The circuit device according to claim 4, wherein the pulse generating circuit generates a first enable signal and a second enable signal which enters an active state in a predetermined period after the first enable signal enters an active state, wherein the first enable signal and the second enable signal are used in the pulse generating circuit, wherein the constant current source and the reference voltage are set to an on state as the first enable signal enters the active state, wherein the comparator is set to an on state as the second enable signal enters the active state, and wherein the pull-up transistor is set to an on state when the second enable signal is in a non-active state.

6. The circuit device according to claim 5, wherein the pulse generating circuit further includes a discharge transistor, and wherein when the first enable signal is in the active state and the second enable signal is in the non-active state, the electric charge which is charged in the capacitor are discharged by the discharge transistor.

7. The circuit device according to claim 3, wherein the control circuit generates the intermittent operation control signal on the basis of the pulse signal.

8. An integrated circuit including a circuit device, the circuit device including an amplifier circuit to which a signal from a sensor is input, and a control circuit that controls the sensor and the amplifier circuit, and an intermittent operation of the sensor and an intermittent operation of the amplifier circuit are controlled by an intermittent operation control signal output from the control circuit, and the intermittent operation control signal including a first intermittent operation control signal that controls the intermittent operation of the sensor and a second intermittent operation control signal that controls the intermittent operation of the amplifier circuit, and the first intermittent operation control signal enters the active state in a predetermined period after the second intermittent operation control signal enters the active state, wherein a settling time of the sensor is shorter than a settling time of the amplifier circuit.

9. A detection device comprising:

a circuit device;

a sensor; and an MCU (Micro Controller Unit) that controls the circuit device, the circuit device including an amplifier circuit to which a signal from a sensor is input, and a control circuit that controls the sensor and the amplifier circuit, and an intermittent operation of the sensor and an intermittent operation of the amplifier circuit are controlled by an intermittent operation control signal output from the control circuit, and the intermittent operation control signal including a first intermittent operation control signal that controls the intermittent operation of the sensor and a second intermittent operation control signal that controls the intermittent operation of the amplifier circuit, and the first intermittent operation control signal enters the active state in a predetermined period after the second intermittent operation control signal enters the active state, wherein a settling time of the sensor is shorter than a settling time of the amplifier circuit.

* * * * *